United States Patent
Mei et al.

(10) Patent No.: US 7,504,312 B2
(45) Date of Patent: Mar. 17, 2009

(54) STACKED ELECTRICAL RESISTOR PAD FOR OPTICAL FIBER ATTACHMENT

(75) Inventors: Zequn Mei, Fremont, CA (US);
Richard D. Bjorn, Milpitas, CA (US);
Frans Kusnadi, San Jose, CA (US);
John Cameron Major, San Jose, CA (US)

(73) Assignee: Emcore Corporation, Albuquerque, NM (US)

( * ) Notice: Subject to any disclaimer, the term of this patent is extended or adjusted under 35 U.S.C. 154(b) by 222 days.

(21) Appl. No.: 11/700,291

(22) Filed: Jan. 31, 2007

(65) Prior Publication Data

US 2007/0132064 A1    Jun. 14, 2007

Related U.S. Application Data

(62) Division of application No. 10/370,294, filed on Feb. 18, 2003, now Pat. No. 7,199,446.

(51) Int. Cl.
*H01L 29/00* (2006.01)
(52) U.S. Cl. .................. 438/382; 438/107; 257/536; 257/E27.111; 257/E21.004
(58) Field of Classification Search .......... 438/382, 438/107; 257/536
See application file for complete search history.

(56) References Cited

U.S. PATENT DOCUMENTS

| | | | | |
|---|---|---|---|---|
| 6,164,837 | A * | 12/2000 | Haake et al. ............. | 385/90 |
| 6,653,155 | B2 * | 11/2003 | Won et al. ............... | 438/3 |
| 2003/0234245 | A1 * | 12/2003 | Cogan .................... | 219/209 |

* cited by examiner

*Primary Examiner*—Ahmed Sefer

(57) ABSTRACT

An electrical resistor structure overlies a substrate and comprises a composite resistor having a first resistor of relatively low resistance and a second resistor of relatively high resistance overlying the first resistor. First and second electrodes make contact with the composite resistor at spaced locations, and a bond pad overlies the second resistor at a position between the electrodes. A metallized fiber is soldered a to a metal bond pad by providing a stacked resistor structure beneath the bond pad, disposing a solder preform over the bond pad, disposing the metallized fiber over the bond pad, and flowing a current through the stacked resistor structure. The stacked resistor structure, when subjected to a current flowing generally along a first axis, is characterized by a temperature profile that has first and second peaks on either side of the bond pad. The fiber is disposed along a second axis in the region of the bond pad where the second axis is at a non-zero angle (possibly, but not necessarily a right angle) with respect to the first axis.

5 Claims, 2 Drawing Sheets

STACKED ELECTRICAL RESISTOR PAD FOR OPTICAL FIBER ATTACHMENT

This application is divisional patent application of U.S. patent application Ser. No. 10/370,294, filed on Feb. 18, 2003 now U.S. Pat. No. 7,199,446,

BACKGROUND OF THE INVENTION

This application relates generally to fiber optic device manufacture and more specifically to techniques for efficiently soldering components such as metallized fiber to a metallized region on a substrate.

In the fabrication of fiber optic modules and the like, it is necessary to bond optical fibers to substrates, and it is common to solder a metallized fiber to a metallized region on a substrate to accomplish such bonding. A gold-tin (Au—Sn) alloy solder such as 80Au-20Sn is often used due to a number of desirable properties. For example, soldering with 80Au-20Sn may be fluxless, thereby eliminating the damage to optical properties due to flux residue. Also, 80Au-20Sn solder is the highest in mechanical strength and creep resistance among soft solders, so that optical alignment can be maintained over a long period. Further, pull test results from fiber metallizing vendors suggest that the interface between Au—Sn solder and metallized (with Ni/Au, for example) fiber is often stronger than that between, for example, eutectic Sn—Pb and metallized fiber.

However, soldering with 80Au-20Sn is challenging. The heating should be localized, as is often required in optical packaging. Since the melting temperature of 80Au-20Sn is relatively high (280° C.), a strong and localized heating mechanism is needed. Laser soldering and electric resist heating are two commonly used mechanisms.

Laser soldering suffers from the limitation that because solder metal reflects laser light, focusing the laser beam directly on solder does not transfer heat efficiently. Also, laser soldering requires an optical path, which is often difficult in many-layered or complicated optical devices.

In electrical resist soldering, a resistor pad is formed on the substrate at or near the bond site, and current is delivered to the resistor to provide the necessary heating. An often-encountered problem is mechanical failures (cracking or delamination) of the heating electric resist layer. Particularly, thick-film resistors are more vulnerable than thin-film resistors, because thick-film resistors contain more inherent defects. Other non-trivial issues in resist heating are the structure design of resistor pad and the parameter selection of the heating process.

SUMMARY OF THE INVENTION

The present invention provides an electrical resistor pad structure and technique for attaching components such as optical fiber that overcome known problems.

In one aspect of the present invention, an electrical resistor structure overlies a substrate and comprises a composite resistor having a first resistor of relatively low resistance and a second resistor of relatively high resistance overlying the first resistor. First and second electrodes make contact with the composite resistor at spaced locations, and a bond pad, overlies the second resistor at a position between the electrodes.

In another aspect of the present invention, a method of soldering a metallized fiber to a metal bond pad comprises providing a stacked resistor structure beneath the bond pad disposing a solder preform over the bond pad, disposing a metallized fiber over the bond pad, and flowing a current through the stacked resistor structure. The stacked resistor structure, when subjected to a current flowing generally along a first axis, is characterized by a temperature profile that has first and second peaks on either side of the bond pad. The fiber is disposed along a second axis in the region of the bond pad where the second axis is at a non-zero angle (possibly, but not necessarily a right angle) with respect to the first axis.

A further understanding of the nature and advantages of the present invention may be realized by reference to the remaining portions of the specification and the drawings.

DESCRIPTION OF SPECIFIC EMBODIMENTS

Structure

Figure 1:
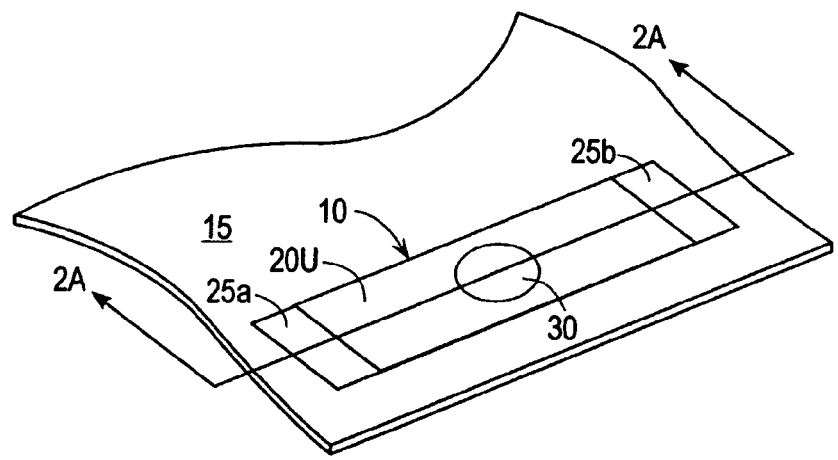
FIG. 1 is a perspective view of a stacked electrical resistor structure according to an embodiment of the present invention.
Figure 2A:
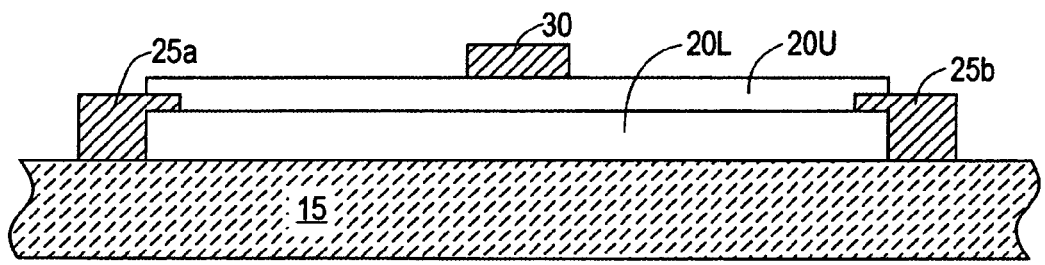
FIG. 2A is a cross-sectional view of the resistor structure taken along line 2A-2A in FIG. 1.

FIG. 1 is a perspective view of a stacked electrical resistor structure 10 according to an embodiment of the present invention. FIG. 2A is a cross-sectional view of resistor structure 10 taken along line 2A-2A in FIG. 1. The figures are drawn with the resistor structure extending in a nominally horizontal plane, and for purposes of description, that orientation will be used, it being recognized that when the resistor structure is ultimately in a larger assembly, the assembly, and hence the resistor structure, may be in any orientation.

Resistor structure 10 overlies a non-conductive substrate 15, and has upper and lower electrically resistive layers 20U and 20L, which are sometimes referred to as the upper and lower resistors. Lower resistor 20L is closest to the substrate, and is not visible in FIG. 1 (being hidden under upper resistor 20U). The resistor structure further includes a pair of metal electrodes 25a and 25b at opposite ends, and a metal bond pad 30 on top of upper resistor 20U. The upper resistor has a higher resistance than the lower resistor.

The basic purpose of resistor structure 10 is to provide heating of bond pad 30 to allow the soldering of a discrete component such as a metallized optical fiber. Such heating is effected by causing a current to flow through the resistor structure by applying a voltage across the electrodes. To facilitate localized heating of the resistor, the portion of the substrate in contact with the resistor should have a low thermal conductivity (say less than 5 watts per meter per degree Kelvin (W/m ° K). To the extent that other elements that are mounted to the substrate would benefit from the substrate having a high thermal conductivity, the resistor can be mounted to a dielectric layer overlying a substrate body having a high thermal conductivity (say more than 20 W/m ° K). However, this design is not an essential feature of the present invention.

As shown in FIG. 2A, electrodes 25a and 25b make contact with both upper resistor 20U and lower resistor 20L, with the fabrication occurring by first forming lower resistor 20L on substrate 15, then forming electrodes 25a and 25b to overlap the ends of lower resistor 20L, and then forming upper resistor 20U to overlie lower resistor 20L and overlap portions of electrodes 25a and 25b. While this arrangement is generally preferred, it is not necessary.

Figure 2B:
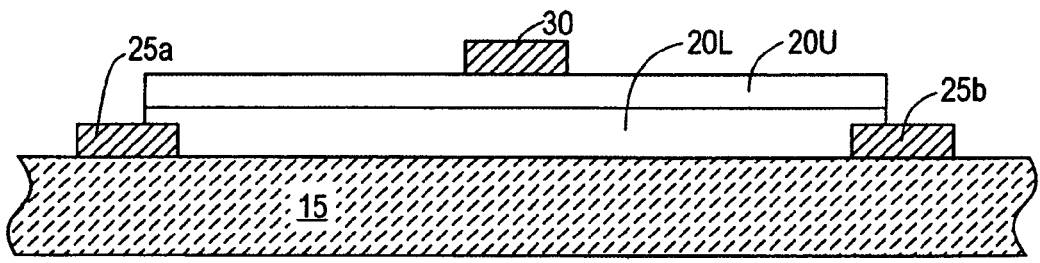
FIGS. 2B and 2C are cross-sectional views of alternative embodiments of the present invention.
Figure 2C:
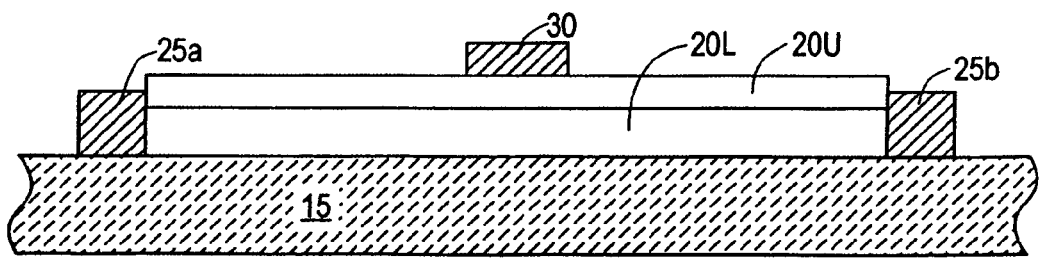

FIGS. 2B and 2C are cross-sectional views of alternative arrangements. In FIG. 2B, electrodes 25a and 25b make contact with both the lower resistor 20L, while upper resistor 20U overlies lower resistor 20L without making direct contact with electrodes 25a and 25b. In this case, lower resistor 20L provides a high conduction path between the electrodes and upper resistor 20U when a voltage is applied between the electrodes. In FIG. 2C, the electrodes contact both the upper and lower resistors along their end surfaces.

Operation

Figure 3A:
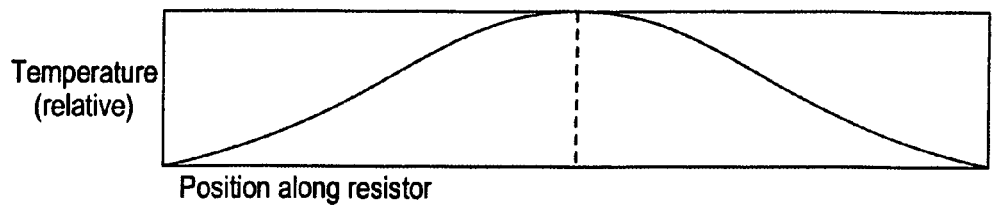
FIGS. 3A-3C are schematic view showing temperature distributions along the resistor structure when a current flows through the resistor structure.
Figure 3B:
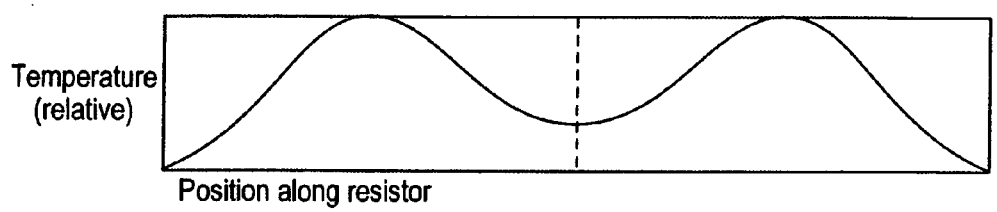
Figure 3C:
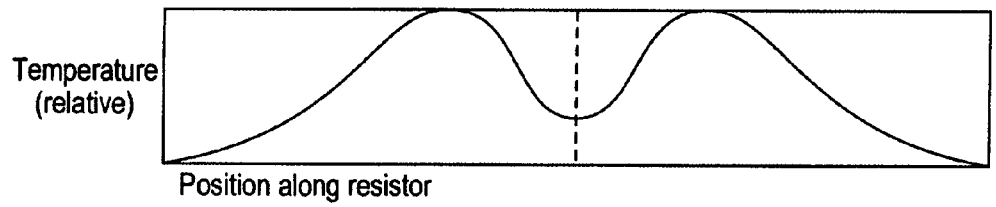

FIGS. 3A-3C are schematic view showing temperature distributions along the resistor structure when a current flows through the resistor structure for different relative values of the respective resistance values of upper resistor 20U and lower resistor 20L. FIGS. 3A and 3B show particular limiting cases, while FIG. 3C shows the additional control provided by the present invention.

Consider a first limiting case where upper resistor 20U is an insulator (i.e., has infinite resistance). In this case, the electrical current flows entirely through lower resistor 20L, and the current is generally constant over the length of the resistor. Since the voltage probes contacting electrodes 25a and 25b act as heat sinks, the temperature increases toward the center of lower resistor 20L, i.e., under bond pad 30. Assuming resistor 20L has a positive temperature coefficient (resistance increases as a function of temperature), the resistance also increases toward the center of lower resistor 20L, thereby enhancing the effect of a temperature peak at the center of the resistor. This is shown schematically in FIG. 3A.

Consider next a case where upper resistor 20U and lower resistor 20L have the same resistance, which is essentially the case of a single resistor. In this case, the current flows equally in both resistors, but bond pad 30 shunts current away from both the resistors. Due to the significantly lower resistance of the bond pad, the amount of power dissipated in the region of the bond pad is significantly reduced. The result is that the temperature profile peaks at two positions, one between electrode 25a and bond pad 30, and the other between bond pad 30 and electrode 25b. This is shown schematically in FIG. 3B. The particular location of the peaks will in general depend on size and geometry, and on the relative resistor values of the pad and resistor.

Consider next a case, in accordance with the present invention, where upper resistor 20U has a higher resistance value than that of lower resistor 20L. The amount of current shunted from lower resistor 20L by bond pad 30 will depend on the difference between the two resistors. For significant differences, the bond pad will primarily shunt current from upper resistor 20U, thereby causing the two temperature peaks to move in toward the center and the temperature difference between the peak positions and the center of the bond pad to increase. This is shown schematically in FIG. 3C.

Figure 4:
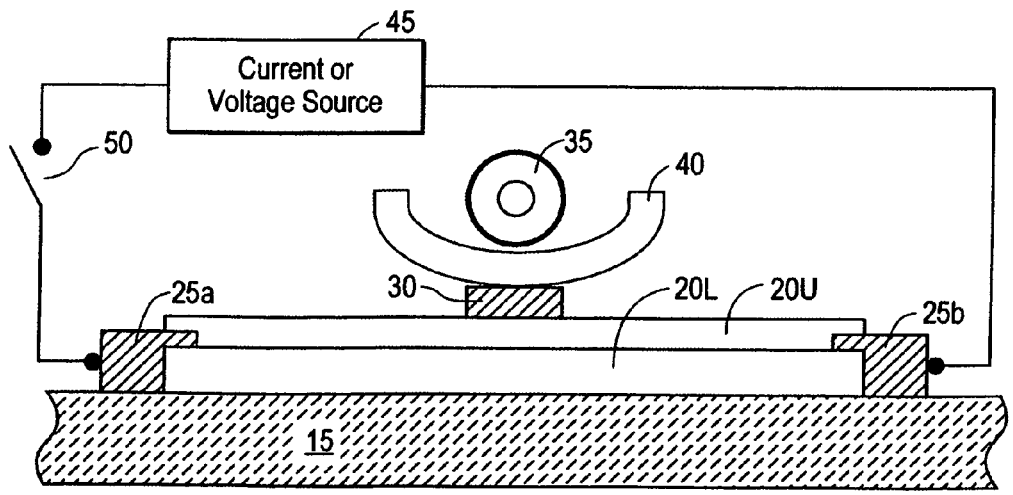
FIG. 4 is a schematic view showing how a soldering operation is facilitated by the present invention.

FIG. 4 shows schematically how the operation of soldering a fiber 35 to bond pad 30 is facilitated by the present invention. A solder preform 40 is placed on the bond pad, and the fiber overlies the preform. Since the fiber normally needs to be aligned to the laser chip or other component before soldering, there is normally some amount of clearance between the fiber and the solder preform. The fiber is shown as extending perpendicular to the plane of the figure while the electrodes are spaced along an axis in the plane of the figure. It is not necessary that the fiber and the resistor be at right angles, although it is desired that they not extend parallel to each other. For example, angles other than a right angle might be dictated by layout considerations.

As mentioned above, traditional soldering processes are challenging. In an ordinary soldering process, the solder preform is heated to its melting point, and seeks to reduce its surface energy by reducing its surface to volume ratio. This causes the molten preform to rise and contact the metallized fiber. Once the solder contacts the fiber, it gradually wets the fiber. It may take a few or several seconds for contact and wetting to occur. In a fluxless soldering process, the solder preform oxidizes, possibly before contacting the fiber or during wetting. Oxidation of the solder surface and wetting the fiber both tend to reduce the solder's surface energy, and thus the oxidation competes with the rising and wetting. Once the solder preform has oxidized, the rising and wetting processes cease. Therefore, a successful fluxless soldering process requires a good inert or reducing atmosphere and possibly a mechanical rubbing action.

In the present invention, the stacked resistor structure provides a characteristic two-peak temperature profile. Thus, when a short pulse of current is caused to flow through the resistor structure, as denoted schematically by a current or voltage source 45 and a switch 50, the localized temperature rise (due to the peaks on each side of the central valley) pushes the solder preform towards the fiber, due to the thermal expansion of the resistors. Furthermore, because of the two-peak profile, two things happen. First, the two ends of the solder preform are pushed more than the middle part of the solder preform. Second, the two ends melt before the middle part. Because of this, the solder preform is pushed and its two ends rotate around the fiber. The result is that the solder preform quickly wraps around the fiber, forming a metallurgical bond. The solder process can be accomplished quickly, sometimes in a second or less, but typically no more than a few seconds. The result is a shiny solder joint, which is evidence that oxidation is minimal.

Thus, by suitably controlling the two resistors, a desired temperature profile can be achieved, and can be exploited to facilitate the operation. In typical implementations, a fixed current on the order of 8 to 16 A is caused to flow for about 0.5 to a few (say 5) seconds, for a resistor with a resistance value on the order of 10 to 50 m$\Omega$. A localized power dissipation of relatively short duration will melt the solder with minimal dimensional change. Using a constant current rather than a constant voltage is slightly preferred since it makes it easier to estimate the power in the solder pad. Because the current is constant in the connecting wires and soldering resistor, there is no need to calculate how much voltage is actually applied to the resistor (due to a voltage drop across the connecting wires).

The selection of the relative values of the top and bottom resistors requires a tradeoff. On one hand, the temperature peaks need to be sufficiently separated and the temperature difference between the side peaks and the central valley needs to be sufficiently large, so that the thermal gradient pushes and rotates the solder to wrap around the fiber. On the other hand, if the temperature peaks are separated too much, and the temperature difference between the side peaks and the central valley is too large, because the temperature at the central valley has to reach the solder melting temperature, the side the peak temperatures could be high enough to cause the resistor to break.

Representative Parameters and Fabrication Details

Although the invention is not limited to specific dimensions and materials, representative embodiments will be described. The upper (high-value) resistor has a resistance value in a representative range on the order of 1 ohm/square ($\Omega$/square) to 1 kilo-ohm/square (K$\Omega$/square), with a typical value being on the order of 100 $\Omega$/square. The lower (low-value) resistor has a resistance value in a representative range on the order of 3 milliohm/square (m$\Omega$/square) to 100 m$\Omega$/square, with a typical value being on the order of 20-30 m$\Omega$/square.

The possible ratios of resistance values based on the ranges for the upper and lower resistors vary from a ratio of 10:1 using the lowest high (1 $\Omega$/square) and the highest low (100 m$\Omega$/square), to a ratio of 333,333:1 using highest high (1 K$\Omega$/square) and the lowest low (3 m$\Omega$/square). Using the typical values and (100 $\Omega$/square and 20 m$\Omega$/square) provides a ratio of 5000:1. If the lower resistor has a resistance value of 30 m$\Omega$/square, the ratio is 3333:1. A preferred range of ratios is 100:1 to 100,000:1 with a narrower preferred range of 1000:1 to 10,000:1.

Typical materials include: for upper resistor 20U, lead oxide (PbO) or ruthenium oxide (RuO$_2$); and for lower resistor 20L, gold (Au), silver (Ag), or platinum (Pt). Typical thicknesses are: for upper resistor 20L, 7-10 micrometers ($\mu$m); for lower resistor 20L, 15-20 $\mu$m; and for bond pad 30, 10-20 $\mu$m. The resistors, electrodes, and bond pad are typically fabricated by thick-film technology where the layer material is deposited in a thick liquid or paste form (like paint), and hardened, typically by heating, and the above-mentioned materials are typical materials used in the thick-film inks. Thin-film resistor technology can also be used, and while thin-film resistors are more robust, and can sustain higher temperature, thick-film technology is less expensive. If thin-film technology were used, tantalum and silicon nitride might be suitable materials for the upper (high-value) resistor.

While the current embodiments of the invention have the upper resistor formed directly on the lower resistor, it is possible that embodiments with a thin electrically insulating layer between the resistors would provide some additional design flexibility in achieving a desired temperature profile. Since the embodiments with direct contact between the resistors provide excellent performance, the added complexity of an additional layer appears not to be warranted. Along these lines, it may be possible to use a sandwich of discrete components for the resistor structure, but the current embodiments are known to provide a very solid foundation for the attached fiber, and there is no compelling reason to depart from forming the integral structure where the layers are deposited one layer at a time.

Conclusion

In conclusion, it can be seen that the present invention provides an elegant solution to problems encountered in resistance soldering. While the above is a complete description of specific embodiments of the invention, the above description should not be taken as limiting the scope of the invention as defined by the claims.

What is claimed is:

1. A method of soldering a metallized fiber to a metal bond pad, the method comprising:

providing a stacked resistor structure having first and second layers beneath the bond pad with the first layer lying directly beneath the bond pad having a higher relative resistance than the second layer, the stacked resistor structure, when subjected to a current flowing generally along a first axis, being characterized by a temperature profile that has first and second peaks on either side of the bond pad where the first and second peaks are disposed relatively closer to the bond pad than to a source of the current;

disposing a solder perform over the bond pad;

disposing the metallized fiber over the bond pad with the fiber extending along a second axis in the region of the bond pad, the second axis being as a non-zero angle with respect to the first axis; and flowing a current through the stacked resistor structure.

2. The method of claim 1 wherein the first and second axes are approximately 90.degree. from each other.

3. The method of claim 1 wherein the stacked resistor structure comprises:

a composite resistor comprising first and second resistors, each having nominally upper and lower surfaces, wherein the first resistor's lower surface faces a substrate, the second resistor's lower surface faces at least a portion of the first resistor's upper surface, and the first and second resistors have respective first and second resistance values with the second resistance value being higher than the first resistance value; and first and second electrodes contacting the composite resistor at spaced first and second locations;

the metal bond pad being bonded to the second resistor's upper surface at a location between the first and second electrodes.

4. The method of claim 1 wherein the current is applied in a pulse for a duration on the order of 0.5-5 seconds.

5. The method of claim 1 wherein the non-zero angle is a right angle.

* * * * *